United States Patent [19]
Kobayashi et al.

[11] Patent Number: 4,923,045
[45] Date of Patent: May 8, 1990

[54] CLUTCH DISC HAVING AN INTEGRAL ANNULUS OF FRICTION MATERIAL

[75] Inventors: Tadamasa Kobayashi, Okazaki; Ryoichi Kudo, Toyota, both of Japan

[73] Assignee: Aisin Seiki Kabushiki Kaisha, Kariya, Japan

[21] Appl. No.: 239,759

[22] Filed: Sep. 2, 1988

[30] Foreign Application Priority Data
Sep. 2, 1987 [JP] Japan ................ 62-219610

[51] Int. Cl.⁵ ............................. F16D 13/60
[52] U.S. Cl. ................. 192/107 R; 192/106.2; 192/107 M
[58] Field of Search ............ 192/106.1, 106.2, 107 R, 192/107 M

[56] References Cited
U.S. PATENT DOCUMENTS
4,646,900  3/1987  Crawford et al. ............ 192/107 R FOREIGN PATENT DOCUMENTS
333073  8/1930  United Kingdom ............... 192/107

Primary Examiner—Rodney H. Bonck
Assistant Examiner—Nicholas Whitelaw
Attorney, Agent, or Firm—Burns, Doane, Swecker & Mathis

[57] ABSTRACT

In order to provide a reliable connection between a circular plate mounted on a hub and a friction material having a pair of oppositely faced friction surfaces extending in the axial direction in a clutch disc, a sub plate is secured to the circular plate. This permits the interposition therebetween of frictional material in such a manner that a plurality of axial openings are provided in the circular plate and the sub plate and the friction surfaces project from each opening in opposite axial direction.

8 Claims, 4 Drawing Sheets

CLUTCH DISC HAVING AN INTEGRAL ANNULUS OF FRICTION MATERIAL

BACKGROUND OF THE INVENTION

1. Field of the Invention

The present invention relates to a clutch disc and in particular to a clutch disc having integral friction material included therewith and a pair of axially oppositely facing friction surfaces.

2. Description of the Art

A conventional clutch disc is disclosed in U.S. Pat. No. 4,646,900. In the conventional clutch disc, a circular plate or clutch plate is mounted on a hub. At an outer periphery, the circular plate is provided with a plurality of equally pitched blades which project outwardly in a radial direction. For connecting the circular plate and an integral annulus of friction material, one friction surface thereof is provided with a plurality of equally spaced grooves, each of which extends in the radial direction. Each of the plurality of equally pitched blades is fitted in and bonded to a corresponding radial groove.

However, a predetermined time is required for drying after application of a bonding substance between the blade and the groove in the assembly process of the conventional clutch disc. Further, since the bonding strength between the blade of the circular plate and the groove of the friction material may vary in accordance with ambient conditions, such as temperature, the friction material is subject to removal or other displacement from the circular plate during rotation of the hub which may cause a loose fit or unwanted displacement of the friction material.

SUMMARY OF THE INVENTION

It is, therefore, a principal object of the present invention to provide a clutch disc without the aforementioned drawbacks.

Another object of the present invention is to provide a clutch disc in which no bonding substance or material is employed for connecting a circular plate and friction material.

Yet another object of the present invention is to provide a clutch disc in which the connection between a circular plate and a friction material may be assured even during running conditions and/or rotation of the hub.

To achieve these objects and in accordance with the purposes of the present invention, a clutch disc of the present invention comprises a hub, a circular plate mounted on the hub, a sub plate arrangement or means secured to the circular plate in such manner that a plurality of axial openings are formed in the circumferential direction and a plurality of integral friction material, each of which has a pair of oppositely faced friction surfaces extending in the axial direction and each of which is snugly or tightly fitted between the circular plate and the sub plate in such manner that the friction surfaces project outwardly from each of the openings.

BRIEF DESCRIPTION OF THE DRAWINGS

The above and other objects, features and advantages of the present invention will become apparent and more readily appreciated from the following detailed description of preferred exemplary embodiments of the present invention, taken in connection with the accompanying drawings, in which.

DETAILED DESCRIPTION OF THE PREFERRED EMBODIMENTS

Figure 1:
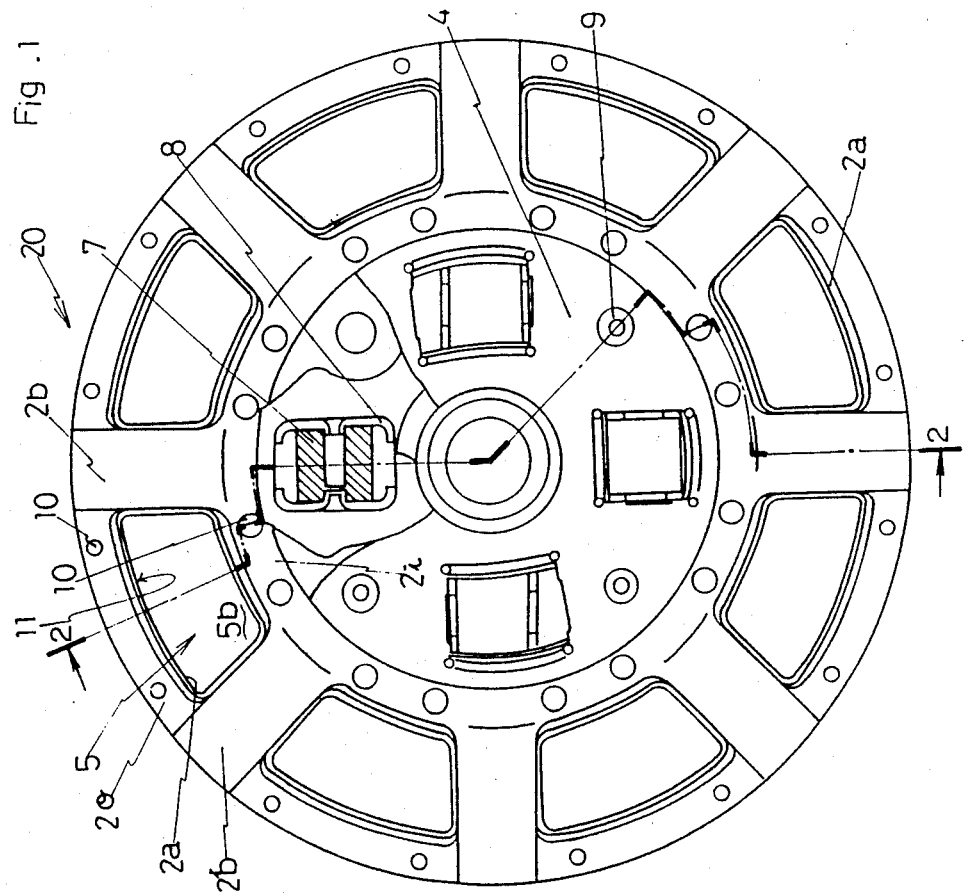
FIG. 1 is a plan view of a clutch disc according to the present invention.
Figure 2:
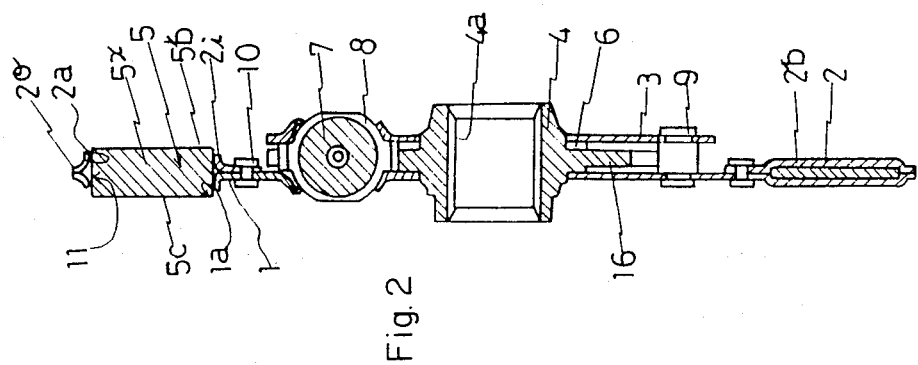
FIG. 2 is a cross-sectional view taken along line 2—2 in FIG. 1.

Referring now to FIGS. 1 and 2, a clutch disc 20 includes a hub 4 having splines 4a provided internally therein for engagement with a transmission drive shaft (not shown) or other suitable driven member. The hub 4 has a radially extending flange 16. A washer 3 and a circular plate 1 made of steel are rotatably mounted on the hub 4 about the flange 16. The washer 3 and the circular plate 1 are fixed in the axial direction with respect to each other by a plurality of rivets 9.

Vibration damping springs 7, each of which is covered with rubber or elastomeric means 8, provide a driving connection between the radially extending flange 16 and the washer 3 of the circular plate or clutch plate 1 as is well known.

In the circular plate 1, there is provided a plurality of equally pitched sector apertures 1a which are arranged in the circumferential direction. A sub plate 2, which is in the form of an annular plate, is also provided therein with a plurality of equally pitched or spaced sector apertures 2a extending in the circumferential direction. The apertures 2a correspond to the apertures 1a of the circular plate 1. An aperture 2a of the sub plate 2 is defined by an outer periphery 20, an inner periphery 21 and a pair of circumferentially spaced bridges 2b—2b. When the sub plate 2 is secured to the circular plate 1 by a plurality of rivets 10, each of the apertures 1a of the circular plate 1 and each of the apertures 2a of the sub plate 2 constitute a unitary axial opening 11 which is of sector shape. Such openings 11 are equally arranged in the circumferential direction of the clutch.

Figure 3:
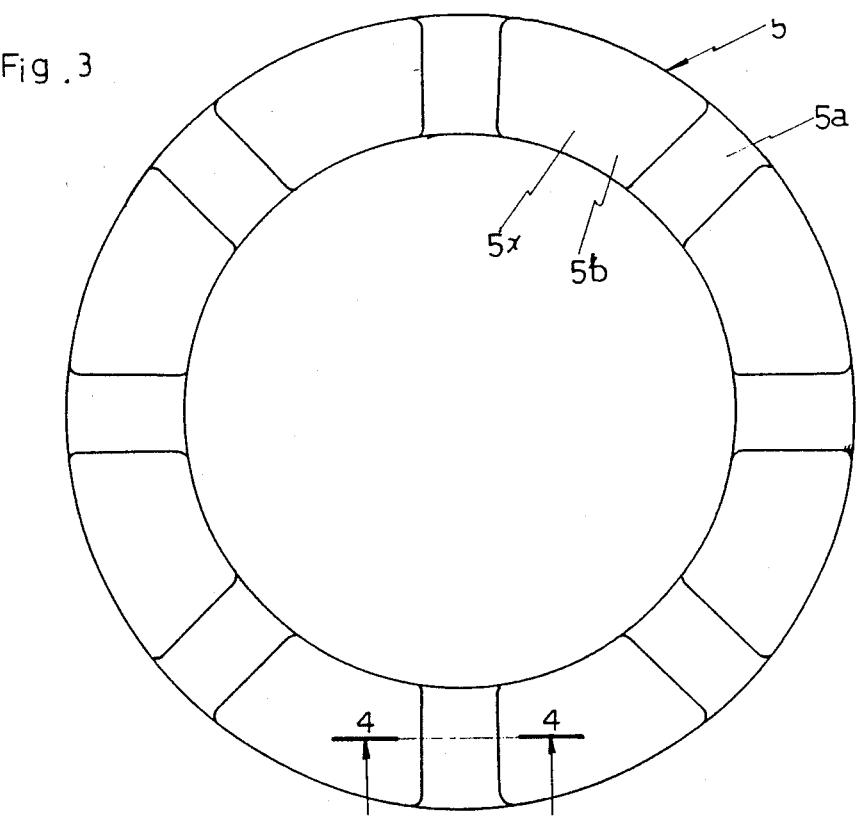
FIG. 3 is a plan view of an integral annulus of friction material.
Figure 4:
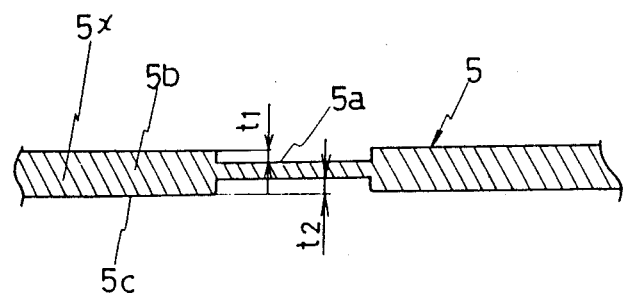
FIG. 4 is a cross-sectional view taken along line 4—4 in FIG. 3.
Figure 5:
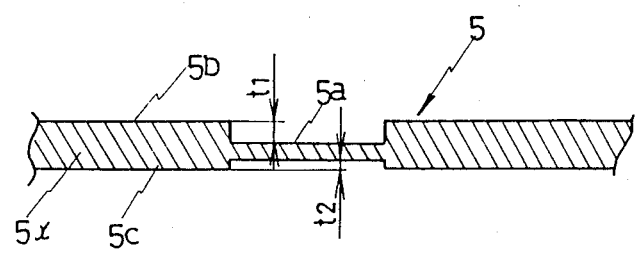
FIG. 5 shows an alternative arrangement of the friction material shown in FIG. 4.
Figure 6:
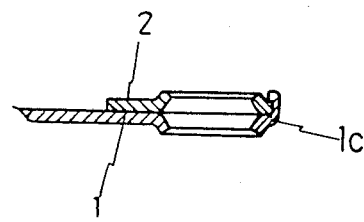
FIG. 6 is a partial cross-sectional view showing a connection between an outer periphery of a circular plate and an outer periphery of a sub plate.

An integral annulus of friction material 5 has a plurality of equally spaced lands 5x with a pair of oppositely faced friction surfaces 5b and 5c. The friction surfaces 5b and 5c are oriented so as to be between a pressure plate (not shown) and a fly wheel (not shown), respectively. Between two adjacent lands 5x and 5x of the friction material 5, there is formed a plurality of connecting portions 5a each of which is snugly or tightly fitted between the circular plate 1 and the bridge 2b of the sub plate 2. The friction surfaces 5b and 5c of the friction material 5 project outwardly from each opening 11 in opposite directions. In this embodiment, the thickness or degree of thickness of the friction surface 5b is equal to that of the friction surface 5c as shown in FIGS. 3 and 4. However, it is possible to enlarge the former with respect to the latter by changing thickness t1 (t2) between the connecting portion 5a and the friction surfaces 5b, 5c as is apparent from FIGS. 4 and 5. As shown in FIG. 6, at an outer periphery of the circular plate 1, a plurality of tongues 1c are formed, each of which is hooked over or connected with an outer periphery of the sub plate 2. Such connecting means or hooked engagement may be utilized in the clutch disc 20 instead of the rivets 10.

Figure 7:
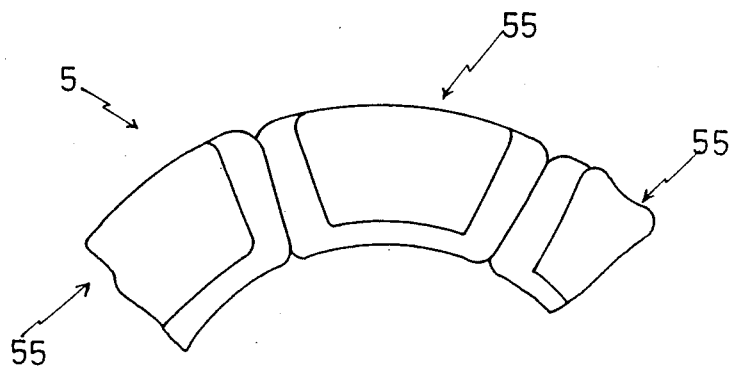
FIG. 7 is a plan view of a friction material arrangement having a plurality of sector pieces.
Figure 8:
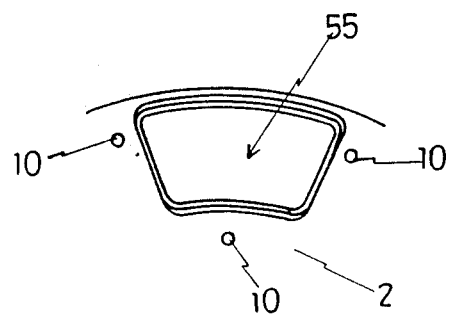
FIG. 8 is a partially plan view of a clutch disc in which the friction material shown in FIG. 7 is employed.

As shown in FIGS. 7 and 8, the friction material 5 may be divided into a plurality of pieces 55, each of which is of sector shape. In this embodiment, three rivets 10 are used for securing each piece 55 of the friction material between the circular plate 1 and the sub plate 2.

Figure 9:
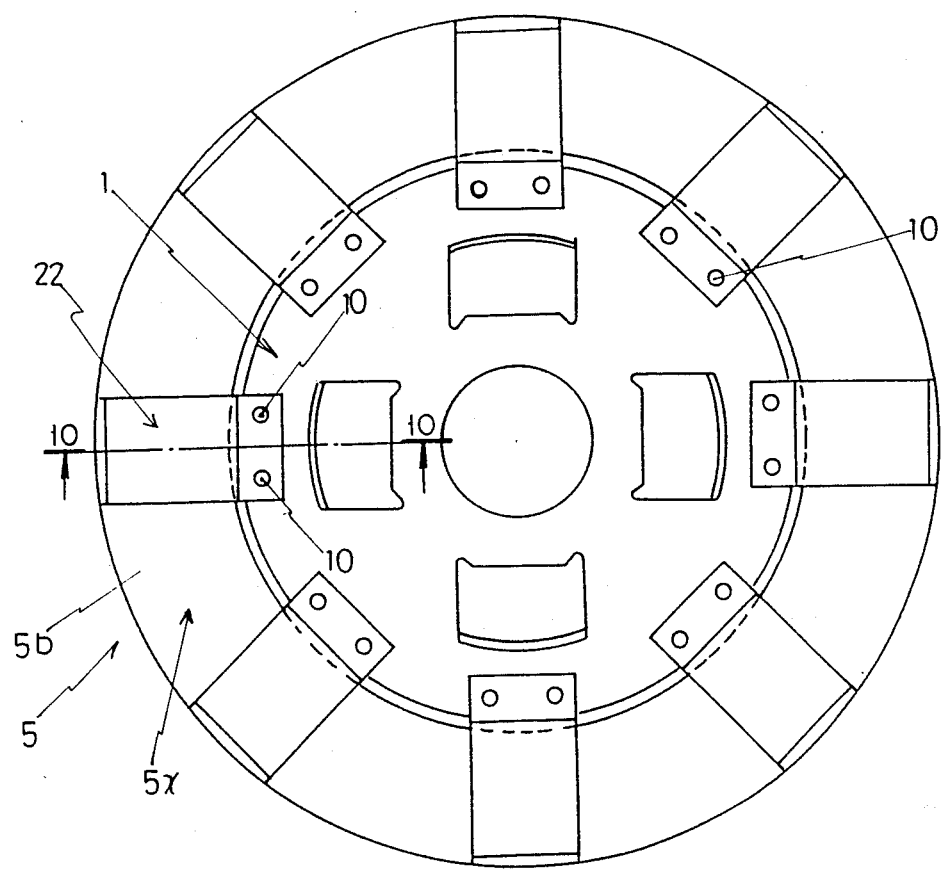
FIG. 9 is a plan view of a clutch disc according to another embodiment of the present invention.
Figure 10:
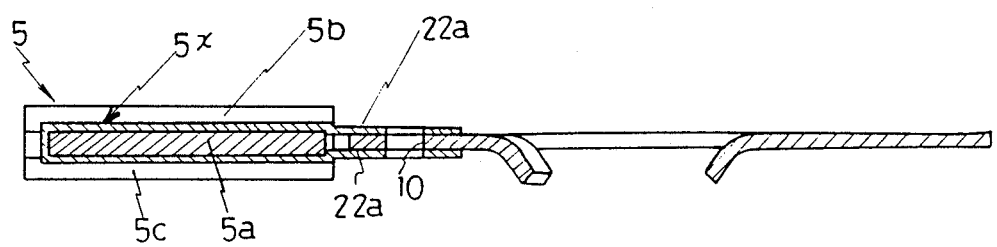
FIG. 10 is a cross-sectional view taken along line 10—10 in FIG. 9.

The sub plate 2 may be constituted or otherwise formed by a plurality of inverted U-shaped metal members 22 as shown in FIGS. 9 and 10. Each of the U-shaped metal members 22 is secured at a distal end portion at two spaced positions 22a and 22a thereof to the circular plate 1 by a plurality of rivets 10, thereby preventing radially outward movement of the friction material 5.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A clutch disc comprising:
   a hub having an integral, radially extending flange;
   a circular plate having a plurality of axial openings and mounted on said hub;
   vibration damping means for providing an elastic driving connection between said flange and siad circular plate;
   a sub plate having a plurality of axial openings and secured to said circular plate so that the plurality of axial openings of the circular plate and the plurality of axial openings of the sub plate are formed in a circumferential direction of the disc; and
   a plurality of integral friction materials, each of which has a pair of oppositely faced friction surfaces extending in the axial direction and each of which is securely fitted between said circular plate and said sub plate so that said friction surfaces project outwardly from each of said axial openings, said plurality of axial openings in said circular plate arranged in the circumferential direction and said sub plate being a circular shape with the plurality of circumferentially arranged axial openings being axially coincident with said openings of said circular plate, said sub plate contacting said circular plate at an outer radial extent of said sub plate and said circular plate, said sub plate connected to said circular plate at an inner radial extent of said sub plate, the inner radial extent of said sub plate being disposed radially outwardly of said vibration damping means and said hub.

2. A clutch disc in accordance with claim 1, wherein said friction materials are formed into an integral annulus.

3. A clutch disc in accordance with claim 1, wherein each of said openings is of a substantially sector shape.

4. A clutch disc in accordance with claim 1, wherein said sub plate is defined by a plurality of separate inverted U-shaped members, each of said members being secured at a distal end portion thereof to said circular plate to substantially prevent radially outward movement of each of said friction materials.

5. A clutch disc in accordance with claim 1, wherein one of said pair of oppositely faced friction surfaces projects from said axial openings to a greater extend than the other one of said pair of oppositely faced friction surfaces.

6. A clutch disc in accordance with claim 1, wherein said circular plate and said sub plate are provided with axially extending flanges along an inner periphery and outer periphery of each said axial openings, said flanges contacting said friction materials along a radially inwardly directed surface and a radially outwardly directed surface, respectively.

7. A clutch disc in accordance with claim 1, wherein said circular plate is provided with a plurality of tongues which hook over the outer radial extent of said sub plate so as to connect said circular plate and said sub plate.

8. A clutch disc in accordance with claim 7, wherein said plurality of tongues are provided along the outer radial extent of said circular plate.

* * * * *